US008413060B1

(12) United States Patent
Agrawal

(10) Patent No.: US 8,413,060 B1
(45) Date of Patent: Apr. 2, 2013

(54) METHODS AND SYSTEMS FOR VISUALLY DISTINGUISHING USER ATTRIBUTE SIMILARITIES AND DIFFERENCES

(75) Inventor: Rakesh Agrawal, Arlington, VA (US)

(73) Assignee: AOL Inc., Dulles, VA (US)

( * ) Notice: Subject to any disclaimer, the term of this patent is extended or adjusted under 35 U.S.C. 154(b) by 960 days.

(21) Appl. No.: 12/000,846

(22) Filed: Dec. 18, 2007

(51) Int. Cl.
*G06F 3/00* (2006.01)
*G06F 15/16* (2006.01)

(52) U.S. Cl. ........ 715/753; 715/751; 715/758; 715/759; 709/204; 709/205; 709/206; 709/207

(58) Field of Classification Search .................. 715/733, 715/751, 753, 758, 759; 709/204–207
See application file for complete search history.

(56) References Cited

U.S. PATENT DOCUMENTS 5,339,391 A 8/1994 Wroblewski et al.
5,479,600 A 12/1995 Wroblewski et al.
5,532,715 A 7/1996 Bates et al.
5,982,369 A 11/1999 Sciammarella et al.
6,339,437 B1 1/2002 Nielsen
6,480,885 B1 11/2002 Olivier
6,505,194 B1 1/2003 Nikolovska et al.
6,950,989 B2 9/2005 Rosenzweig et al.
7,246,128 B2 7/2007 Jordahl
2002/0129015 A1 9/2002 Caudill et al.
2003/0023684 A1* 1/2003 Brown et al. ................. 709/204
2004/0148347 A1* 7/2004 Appelman et al. ............ 709/204
2004/0203363 A1 10/2004 Carlton et al.
2005/0004949 A1 1/2005 Trepess et al.
2005/0055450 A1* 3/2005 Gang ............................ 709/228
2005/0076060 A1 4/2005 Finn et al.
2005/0210387 A1 9/2005 Alagappan et al.
2005/0282530 A1 12/2005 Raff
2006/0075358 A1 4/2006 Ahokas
2006/0085419 A1 4/2006 Rosen
2006/0167944 A1* 7/2006 Baker ........................ 707/104.1
2006/0229902 A1* 10/2006 McGovern et al. ............... 705/1
2007/0143281 A1 6/2007 Smirin et al.
2007/0162507 A1 7/2007 McGovern et al.
2009/0037822 A1* 2/2009 Kandekar et al. ............. 715/733

* cited by examiner

*Primary Examiner* — Steven B Theriault
*Assistant Examiner* — Dino Kujundzic
(74) *Attorney, Agent, or Firm* — Finnegan, Henderson, Farabow, Garrett & Dunner, LLP

(57) ABSTRACT

Methods, computer-readable storage media, and systems are provided to facilitate visually distinguishing common attributes of users an electronic communication network or messaging service. In particular, user profile attributes are compared between a first and second user, and similar attributes are visually highlighted by assigning, for example, a distinct font, font size, color, font effect, and/or other visual effect to the user's screen name to designate which attributes are similar. In addition, or alternatively, when the first user views a user profile of the second user, common user attributes are visually highlighted. In one embodiment, the font, font size, color, and/or font effect assigned to the high-lighted attribute indicates a degree of similarity of the attribute. Such implementations may allow users to more easily recognize and interact with others that have similar interests and attributes.

21 Claims, 6 Drawing Sheets

505

ATTRIBUTE VISUAL DISTINCTIONS:

| ATTRIBUTE (510) | FONT | SIZE | EFFECT | TEXT COLOR | BKGND COLOR (520) |
|---|---|---|---|---|---|
| LOCATION | | | BOLD | | |
| 550 AGE | | | | YELLOW | |
| 420 OCCUPATION | ARIAL | | ITALICS | | |
| MUSIC INTERESTS | | | UNDERLINE | | |
| ROCK MUSIC | | | | | BLACK |
| 430 OTHER INTERESTS | | | | RED | |
| 432 BASEBALL | | BIG | | | |
| 435 ORIENTAL CUISINE | | | BOLD | | |
| 530 SWIMMING | | | | | |
| 540 DISLIKES | | SMALL | | LIGHT GREY | |
| 438 BIRD WATCHING | | | | | |

FIG. 5

METHODS AND SYSTEMS FOR VISUALLY DISTINGUISHING USER ATTRIBUTE SIMILARITIES AND DIFFERENCES

TECHNICAL FIELD

The present disclosure generally relates to electronic communication networks and messaging services, such as Internet-based messaging services. More specifically, and without limitation, the present disclosure relates methods and systems to visually highlight associated attributes of users of, for example, an electronic messaging service.

BACKGROUND

Electronic communication networks, such as Internet-based messaging systems, provide a way for users to interact and converse with one another. Typically, messaging systems allow a viewing user to see the names of other user(s) with which the viewing user wishes to communicate. The viewing user can send another user a message by selecting that user and typing the message. Similarly, the viewing user can receive messages from other users, the received messages being displayed on the viewing user's screen in conjunction with a name that identifies who sent the message.

Most messaging systems include a chat feature that allows a viewing user to enter a "chat room" with one or more other users. Chat rooms can be organized by chat topic or, in some cases, can be created for general discussion with one or more invited users. Typically, a viewing user can see the names of other users in the chat and a window displays the chat dialogue. The viewing user can type a message to everyone in the chat room, or, in some cases, can select particular users to whom a message should be sent.

In certain cases, one or more messaging systems may be part of a larger suite of communication services provided by an online service provider. For example, America Online™ (AOL) provides its members with a number of online communication services, such as instant messaging (IM), e-mail, and message boards, some of which have particular and peculiar nuances, requirements, and features distinct from other messaging systems.

While messaging systems allow users to socialize over electronic networks such as the Internet, improvements are needed to allow users to more quickly identify or recognize which other users share similar interests and characteristics. Therefore, a need exists for systems and methods for displaying user attribute similarities and differences, as described in various embodiments, below.

SUMMARY

In accordance with an embodiment, a user can visually distinguish which attributes the user has in common with other users of a messaging service. For example, a messaging service running on a device operated by the first user can retrieve a first plurality of attributes associated with a second user, and compare the attributes of the second user to the attributes of the first user. Associated attributes (i.e., common and/or opposing) between the first and second users are then visually highlighted or distinguished to the first user.

The presentation of the visually distinguished common attribute(s) can vary between embodiments. In one embodiment, the first user may select a second user for the purposes of viewing the user profile. Various attributes of the second user may then be displayed, the attributes being visually distinguished based on similarities and/or differences with the first user. For example, if both users have a common favorite music group, the music group may be displayed in a larger font than other attributes that are not common between the users.

In another embodiment, such as in a "chat room" setting, the chatting users' screen names may be listed on the screen of the first user's device. Various visual highlights may be applied to the names to help the first user distinguish which attributes the first user has in common with a particular user. For example, a name presented in bold might represent that the user has a similar occupation to the first user, while an italicized name may indicate that the users both share an interest in a particular extracurricular activity, such as running.

In addition, the first user may define which visual effects apply to particular attribute types in one embodiment. For example, if a particular attribute is very important to the first user, the first user can assign a particular visual effect (i.e., visual highlight), such as a large font size, to apply to that particular attribute. When viewing a list of users and/or a user profile, the visual highlight may allow the first user to visually distinguish the users with that attribute commonality.

One or more visual highlights may be applied to the screen names of the second user in one embodiment. For example, if the second user has three different attributes in common with the first user, and all three attributes have their own distinguishing effects, then all three effects may be applied to the screen name of the second user. When the first user observes the three effects, the first user may recognize all three common attributes without viewing the second user's profile. In the event that the first user does view the second user's profile, the three attributes will each be displayed with their own respective distinguishing visual effect in one implementation.

In one embodiment, the device operated by the first user contacts a server and downloads a plurality of attributes associated with the second user. In another embodiment, the attributes are downloaded directly from the second user. In addition, while attribute comparison is performed by the first user's device in one embodiment, the server performs the comparison in another embodiment.

Additional objects and advantages will be set forth in part in the description which follows, and in part will be obvious from the description, or may be learned by practice of the embodiments. The objects and advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate several embodiments and together with the description, serve to explain the principles of the embodiments.

FIG. 5 is a diagram of an exemplary screen for viewing or defining which visual highlights correspond to various attributes, in accordance with an embodiment;

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Embodiments of the invention may be implemented to allow a user to visually distinguish which attributes the user has in common with other users. As referred to herein, an attribute can be any tracked characteristic or interest of a user. For example, an attribute may be a person's age, birthday, sex, geographic location, occupation, music interest, favorite television show, or extracurricular activity. The attributes need not be predefined by the system operator in one embodiment. Instead, each user may freely generate attributes that they wish to associate with themselves.

A user, as referred to herein, is any person who uses a messaging service for communicating over an electronic network, such as the Internet. The messaging service may include a chat feature, and may be part of a larger software suite. For example, in one embodiment, the messaging service is part of an online video game (that allows players to interact), while in another embodiment, the messaging service is provided through a program, such as AOL Instant Messenger™. In still another embodiment, the messaging service is provided as part of a web browser.

In one implementation, a first user is presented with a list of user screen names corresponding, for example, to a plurality of users with whom the first user has chosen to communicate with. The screen names may be visually highlighted in a manner that allows the first user to distinguish which attributes or attribute types the first user has in common (or not in common) with the other users in the list. An attribute type may encompass a single attribute, such as the user's occupation, or cover many attributes, such as multiple favorite music bands. As referred to herein, an attribute may actually be an attribute type, and vice versa.

In another implementation, a first user can request a profile of a second user, such as a user in the user list, by clicking on the screen name of the second user or selecting an option to view that user's profile. The user profile may be displayed as a list of attributes. According to one aspect, the attributes are assigned visual highlights based on their respective commonality to the first user's attributes, thereby allowing the first user to visually distinguish which attributes are common. In another aspect, a single visual highlight is applied to all common attributes.

Figure 1:
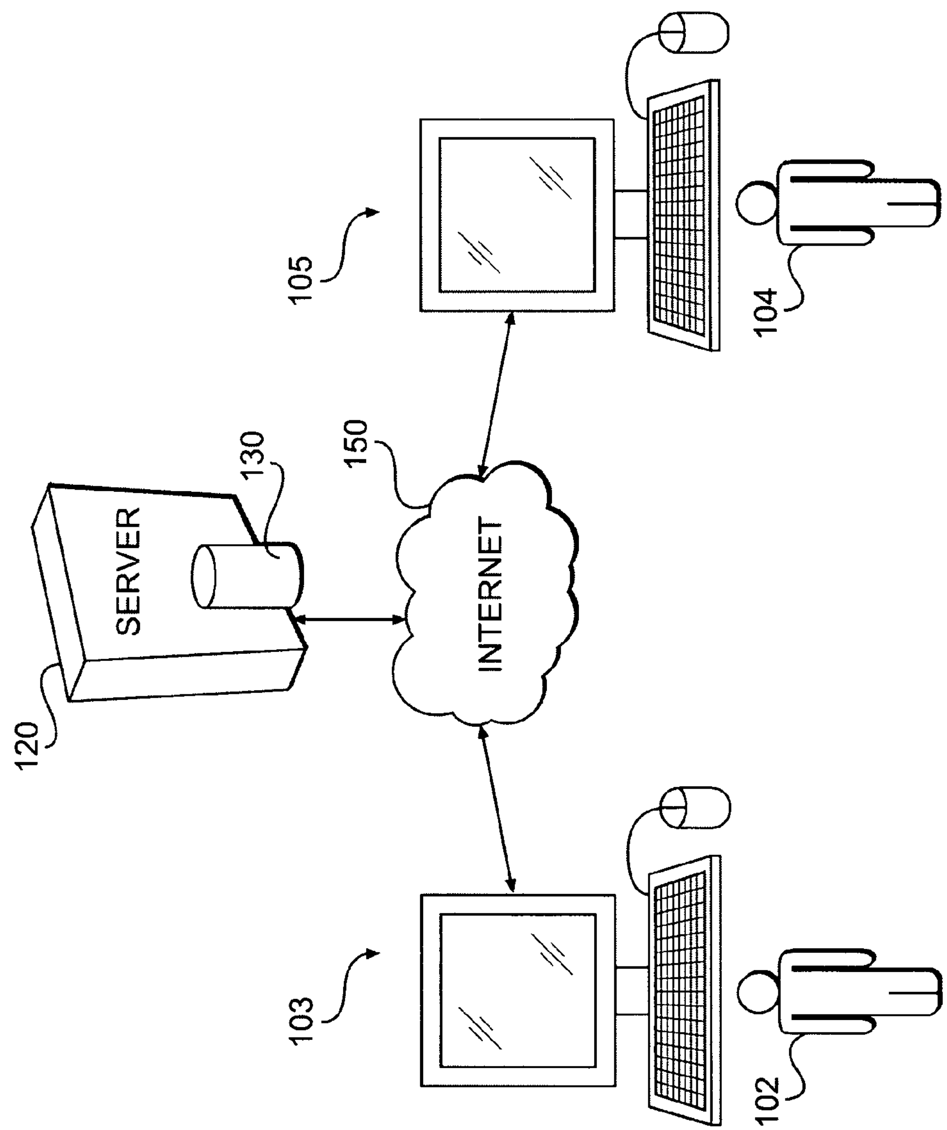
FIG. 1 is a diagram of an exemplary system for visually distinguishing user attribute associations, in accordance with one embodiment.

FIG. 1 is a diagram of an exemplary system for visually distinguishing user attribute similarities (and/or conflict), in accordance with one embodiment. Turning to FIG. 1, a first device 103 is operated by a first user 102. The first device 103 may be an electronic device with access to an electronic network, such as the Internet 150. Through the Internet 150 and/or other wired or wireless networks, first device 103 may communicate with a second device 105 operated by a second user 104. In addition, the first device 103 may communicate with a server 120 that is communicatively coupled to a database 130. In one embodiment, messages sent to the second user 104 are actually relayed to the second user 104 by server 120.

The first device 103 and second device 105 can each be any electronic device capable of accessing electronic content, such as a personal computer, laptop, cell phone, PDA, personal media player, or similar device. Generally, the devices 103 and 105 may include a processor capable of executing instructions stored on a computer-readable storage medium, such as a disk, CD, DVD, RAM, flash memory, or any other known memory or electronic storage medium.

Consistent with certain embodiments, the first device 103 is operated by the first user 102, who communicates with the second user 104 via an electronic messaging service. The messaging service may be installed on both the first 103 and the second 105 electronic devices, although, as previously mentioned, the messaging service may be part of some software assemblage, such as a web browser or video game.

In one implementation, before the first user 102 can contact or communicate with user 104 via the messaging service, the first device 103 may contact the server 120 to download a list of users that the first user wishes to communicate with (e.g., a "buddy list"). The receiving user may have to authorize communication with the first user 102 before the communication can be successfully sent.

Figure 2:
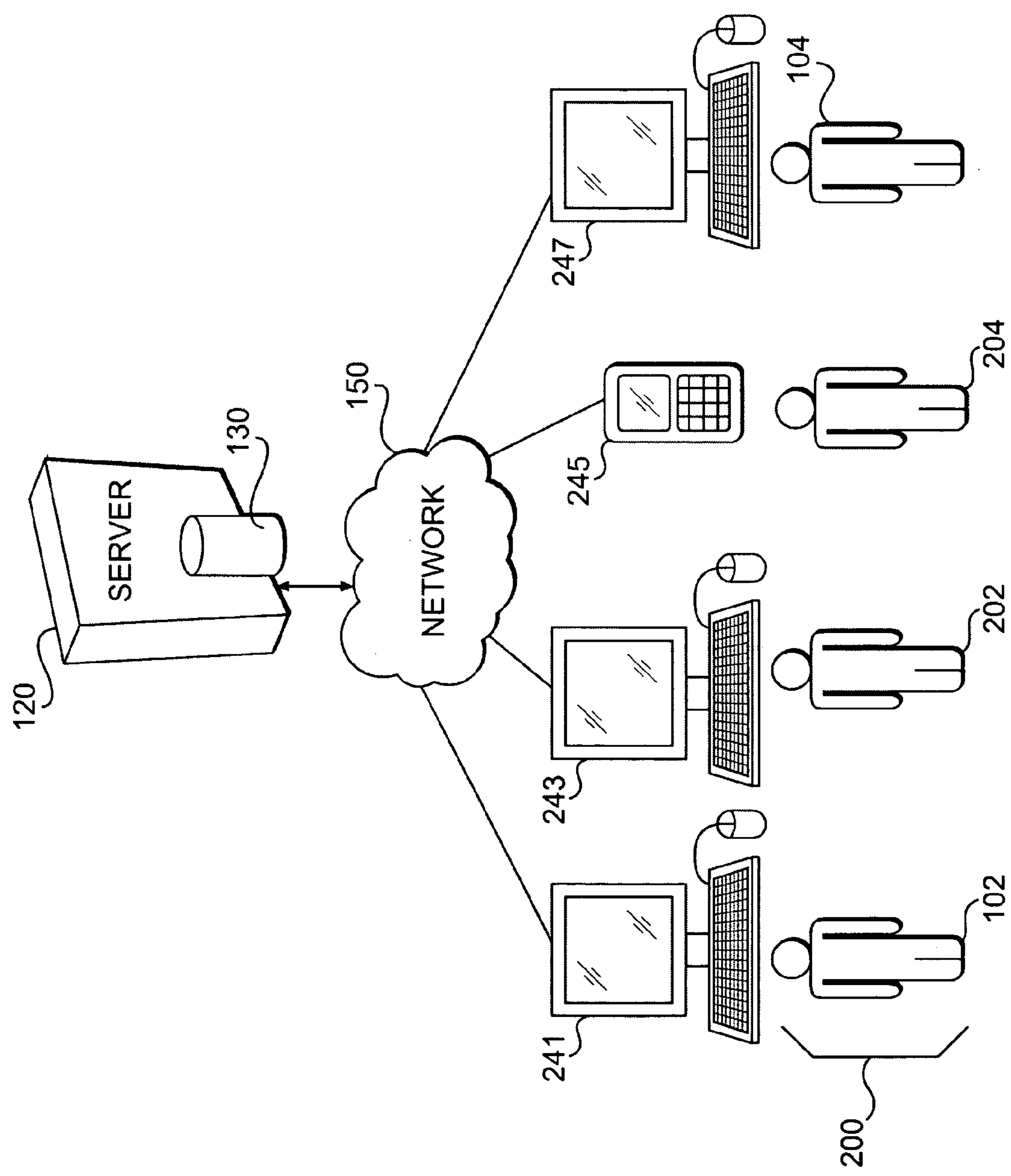
FIG. 2 is a diagram of another exemplary system for visually distinguishing user attribute associations, in accordance with another embodiment.

Turning to FIG. 2, another diagram of an exemplary system for visually distinguishing user attribute associations is shown, in accordance with one embodiment. Multiple users 200 communicate with one another over an electronic network 150, such as the Internet, via devices 241, 243, 245, and 247. The users 200 include the first user 102 and second user 104 from FIG. 1. Each user 200 may be participating in a chat facilitated by the messaging service. Therefore, in this example, the first user 102 may see the screen names for users 202 and 204 and second user 104. In addition, other users (not shown) may be participating in the same chat.

Each of the users 200 may select attributes that describe themselves. For example, some of the users 200 may enter their age, birthday, location, occupation, musical interests, extracurricular activities, favorite sports teams, etc. In accordance with one embodiment, these attributes may be compared so that each user can visually distinguish commonalities that they have with other users in the chat room or in their buddy list. If a user has not yet created a user profile by defining their attributes, comparison with that user may be bypassed in one embodiment.

Figure 6:
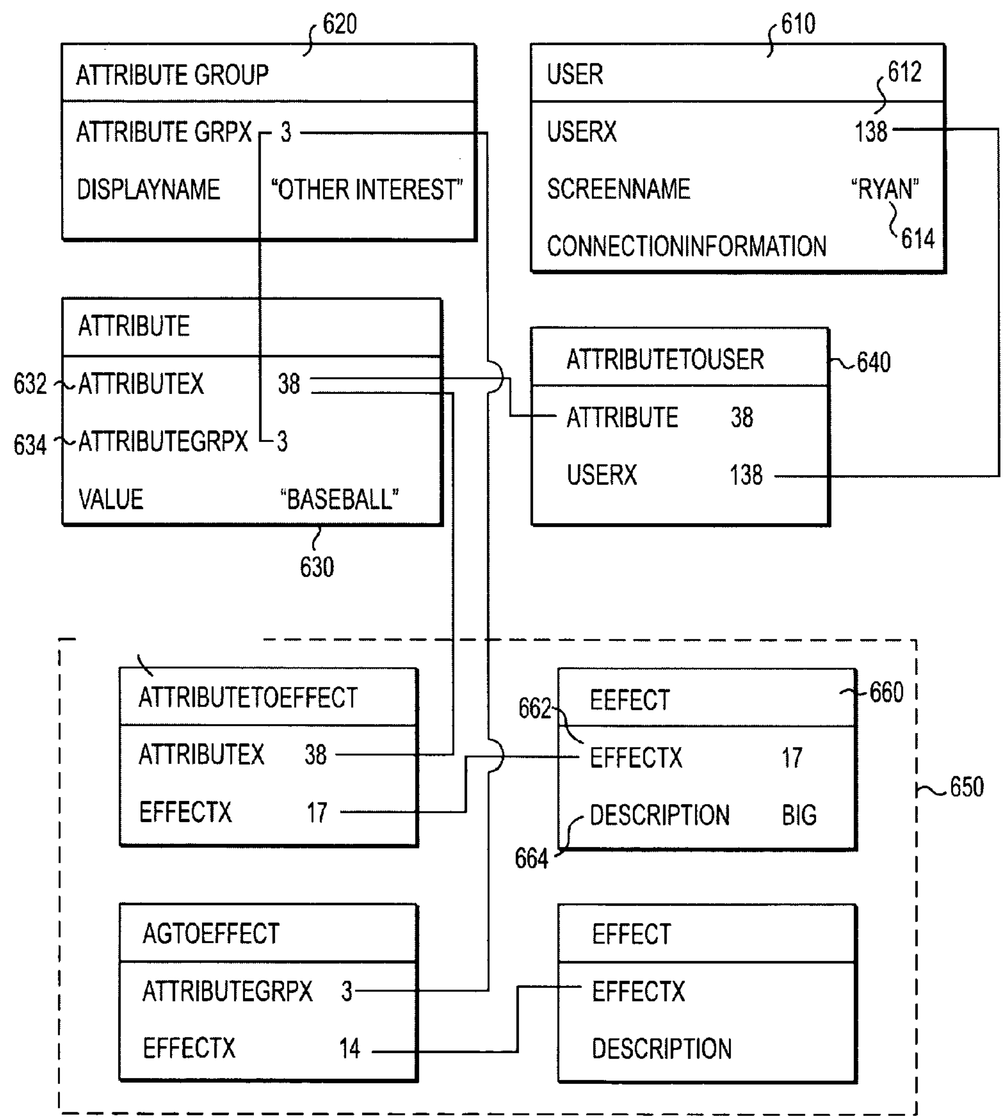
FIG. 6 is a diagram of exemplary database structures that may be used for storing and retrieving control decision records used in creating a content profile, in accordance with an embodiment.

In one implementation, the attributes of each user may be stored by server 120 in database 130. In FIG. 6, an example schema is shown for storing attributes and attribute types for each user. As further described below, users may be given a unique identifier 612 that can be used to identify each attribute 630 associated with the user, such as via the "AttributeToUser" table 640. Similarly, each attribute 630 may have unique identifiers 632 and 634 that may be used to relate the attribute to one or more users 610 or one or more attribute groups 620. The server may locate all users belonging to a particular user list by storing a user list for each user, in one embodiment. Many different schemas and methods for storing user attributes are possible, and FIG. 6 is only one simplified example.

Turning back to FIG. 2, after the server 120 locates the attributes, the first user 102 may download the attributes that relate to the listed user(s), profiled user, and/or chat participants by contacting the server 120. The attributes may then be stored on a storage medium on first device 103 (this is relabeled 241 in FIG. 2) until the messaging service is closed or shut down. In another embodiment, the first device 103 stores the attributes for longer periods, so that only new or modified attributes need be retrieved from server 120 in the future. In yet another embodiment, attributes are received directly from the users (rather than from the server 120). For example, the second user's 104 attributes may be automatically sent from second device 105 (this is relabeled 247 in FIG. 2) to first device 103 upon receiving a request from the first device 103.

The attributes may be compared against one another to determine which attributes the respective user has in common with the viewing user. In one embodiment, this comparison is performed by server 120. In another embodiment, the comparison is performed by first device 241, once the first device 241 has received the attributes.

In one embodiment, attribute types may be compared against one another. For example, although each extracurricular activity comprises a separate attribute, the activities may be organized under a single attribute type (e.g., "activities"). Commonalities between these attribute types may be determined by comparing each extracurricular activity of the second user 104 against each extracurricular activity of the first user 102. If a predetermined threshold number or percentage of similarities exist, the attribute type may be deemed common between the users. The user may be able to define how many matches or percentage of matches are needed under a particular attribute type in order for a strong commonality to exist. In another embodiment, some attribute type comparisons may be described by a value that indicates the strength of the commonality. The strength value may effect the visual representation of the second user's 104 attribute to the first user 102.

Figure 3:
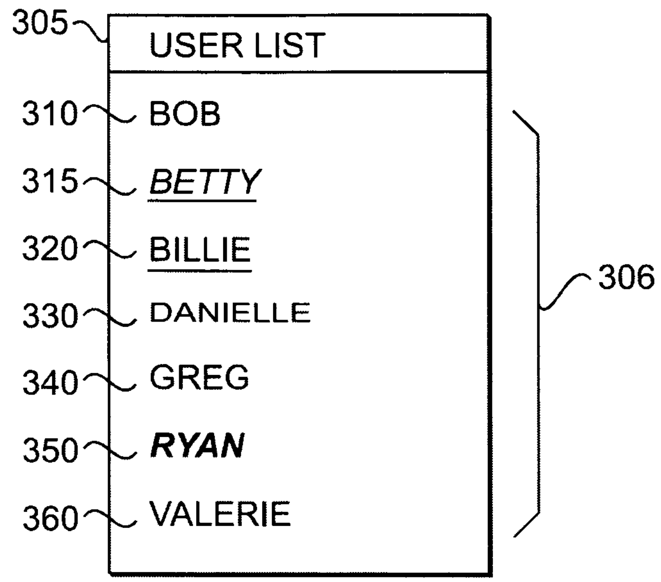
FIG. 3 is an exemplary diagram of a list of users, incorporating exemplary visual highlights that visually distinguish associated attributes, in accordance with one embodiment.

Once the attribute comparisons are complete, the messaging service can visually distinguish common (and uncommon) attributes by adding visual highlights to a user screen name. For example, as shown in FIG. 3, an exemplary user list 305 contains multiple user screen names 306, such as Bob 310, Betty 315, Billie 320, Danielle 330, Greg 340, Ryan 350, and Valerie 360. A similar user list 305 may be utilized in a messaging service during interactions in a chat room, or as a buddy list to indicate a list of common contacts with which the first user wishes to periodically communicate. Visual highlight(s) may also be helpful when an unknown user contacts the first user 102. The first user may be able to better gauge commonalities with the stranger before accepting the communication.

As shown in FIG. 3, various visual highlights, such as fonts, font sizes, and font effects, are used in displaying the user names 306. In addition, the visual highlights may also include different colors for the text and/or text background, or motion effects, such as blinking text or animating text.

Each specific visual highlight may represent a common attribute or attribute type in one embodiment. For example, a strong common interest in music may be visually indicated by applying an underline font effect to each user name that corresponds to a user with that shared interest. When the first user 102 looks at the user list 305, the first user 102 is able to visually recognize that both Betty 315 and Billie 320 share a strong common music interest with the first user 102 because both screen names are underlined.

Some screen names may include multiple visual highlights. For example, Betty 315 is both italicized and underlined. The italics could indicate that Betty 315 has the same occupation as the first user 102, in one embodiment. In addition, the text or text background may vary in color to indicate the number or percentage of commonality in extracurricular activities as compared to the first user. For example, if Betty 315 does not have many extracurricular activities in common with the first user 102, then the screen name, "Betty," may be presented in a blue hue. However, if Betty 315 has many activities in common, "Betty" may be presented in bright red.

In still another embodiment, graphical icons or other objects (not shown in the figure) may appear next to a screen name to represent a common attribute or attribute type. For example, graphical icons may appear next to a screen name to highlight common attributes in terms of extracurricular activities or geographical activities. Other examples include graphical icons or objects defined by a user to designate or distinguish between business colleagues, family members, neighbors, and sports or club members.

Many other visual highlights may be tied to particular user attributes. Bolded text could indicate that the user, such as Ryan 350, lives in the same city as the first user 102. Virtually any attribute or attribute type may be assigned a distinguishing visual effect in one embodiment. In another embodiment, more than one attribute may be assigned the same visual effect. The first user 102 may need to view the user profile to determine precisely which attribute is common in that embodiment.

Other effects may be applied based on total numbers of commonalities. For example, the screen name for a user that meets a threshold number of many similarities (or a percentage of similarities) may be presented in a bolded and enlarged font, such as Ryan 350. This allows the first user 102 to immediately determine users that share many different attributes with the first user 102. In one embodiment, the user with the most in common with the first user 102 among the listed users is distinguished by adding a visual highlight, such as a flashing color or enlarged text. In another embodiment, a uniform visual highlight is used for any user that meets a threshold level of similarities.

Conversely, users that have little or no attributes in common may be displayed using a smaller font, as exemplified by the user. Danielle 330, in FIG. 3. In addition or in the alternative, the screen name for a user with few or no common attributes may be presented in a grey text. In one embodiment, the user with the least in common with the first user is identified with a visual highlight.

Figure 4:
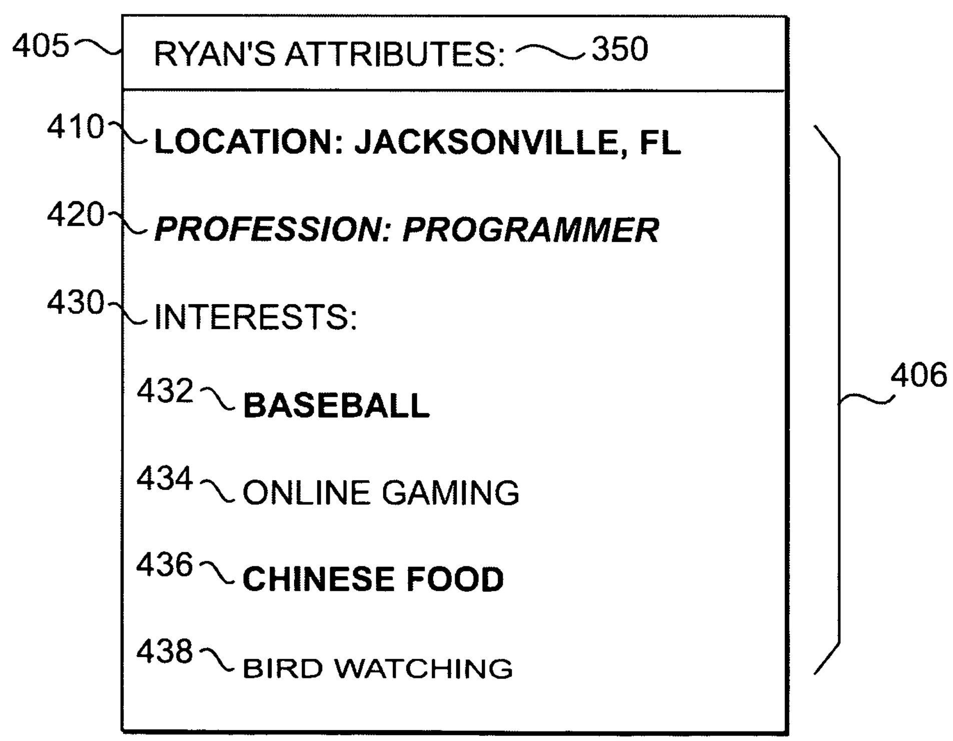
FIG. 4 is an exemplary diagram of a user profile, incorporating exemplary visual highlights that visually distinguish the attributes based on commonalities and differences with another user, in accordance with one embodiment.

In one embodiment, the first user 102 can view a user profile for any user 306 in the user list 305, such as by clicking that user's screen name (and/or by selecting an option to view the user profile). Turning to FIG. 4, an example user profile is illustrated with an exemplary attribute list 405 for a user with the screen name "Ryan" 350. The actual attributes 406 that are tracked by the messaging program may vary in different embodiments. In this example, Ryan has submitted attribute information for his location 410, profession 420, and interests 430. His interests 430 may be considered an attribute type, and several individual interests, each treated as a separate attribute, fall beneath the interests 430 attribute type. In this example, those interests include baseball 432, online gaming 434, Chinese food 436, and bird watching 438.

FIG. 4 shows one example of how a user's attributes may be visually distinguished in a user profile based on commonalities with the first user 102. In this example, the first user 102 views a user profile for the user named Ryan 350. The profile includes Ryan's 350 entered attributes 406. The attributes 406 appear along with visual highlights that indicate commonalities with the first user. In this example, the location attribute is bolded, indicating that Ryan 350 and the first user 102 both live in the same locality. In addition, the occupation attribute 420 is italicized, indicating that both Ryan 350 and the first user 102 share the same line of work. Several interests 430 are also shown in this example. As indicated by the large font, both the first user 102 and Ryan are interested in baseball 432. In addition, there appears to be an overlapping interest in Chinese Food 436. The first user 102 does not share Ryan's interest in online gaming 434, so this attribute is not provided any visual highlight.

In one embodiment, a user may specify dislikes. In this example, bird watching 438 is disliked by the first user 102. Therefore, when first user 102 views Ryan's 350 user profile 405, Ryan's 350 interest in bird watching 438 shows up in small text that is colored light grey, indicating a conflicting interest between the two users.

In addition, as previously mentioned, not all embodiments apply unique visual highlights to each common attribute. Instead, in one embodiment, a uniform visual highlight, such as bold text, is applied to all common attributes.

In embodiments that provide unique visual highlights, a key for the visual highlights applied to each attribute may be viewable on a visual highlight definition screen, such as screen 505 shown in FIG. 5. As shown in FIG. 5, the first user's 102 attributes are listed in column 510. The visual highlights 520 assigned to each attribute 510 may be determined by looking in the respective row for each attribute 510.

For example, when the first user 102 views another user with a common profession, the user's screen name and/or occupation attribute will be presented in Arial font and in italics. As another example, users with common other interests 430 will be displayed in red. In addition, the user screen name and/or attribute will be a big font size if the other user is indicates he or she is interested in baseball 432. When the first user 102 is presented with the screen name of another user, a bold effect will be applied if the user likes Chinese food, as Chinese food is a subset of oriental cuisine 435.

In the example shown in FIG. 5, no default visual highlight has been assigned to the first user's interest in swimming 530. Therefore, even if the first user 102 views another user with this common attribute, the attribute will not cause a visual highlight to be applied in one embodiment.

In addition, FIG. 5 shows that the first user 102 has defined bird watching 438 as something the first user 102 dislikes 540. In this example, the "dislikes" category 540 is an attribute type 540 that is assigned a small font size and a light grey text color. In one aspect, attributes associated with an attribute type receive the visual highlights defined for that attribute type. Therefore, in this example, if the first user 102 views the user profile of a user that likes bird watching 438, the attribute may be presented with small light-grey text, representing a dissimilarity between the users. Conversely, if the other user also dislikes bird watching, this may be counted as an attribute commonality.

Continuing with FIG. 5, in one implementation, the user may define which visual highlights apply to each attribute. For example, the first user 102 may be able to select the various visual highlights 520 for each attribute 510. In one embodiment, this is accomplished by providing drop down selection boxes or a similar mechanism for each cell in the attribute 510 to visual effect 520 grid. In this way, the first user 102 may customize the presentation of common (or uncommon) attributes to their liking. If the first user values commonality in some attributes over others, the first user 102 may provide a more striking visual highlight to those attributes to make the commonalities even more easily distinguishable.

In some embodiments, the same visual effect may only be used once. In other embodiments, the same visual effect may be assigned to multiple attributes. In addition, the exact number and variety of visual highlights available varies between embodiments. As previously mentioned, one embodiment may use only one visual highlight.

If the messaging service encounters a conflict in choosing which visual highlight(s) to apply, the messaging service may select the applicable visual highlight based on a priority scheme, in accordance with one embodiment. For example, the first user 102 may rank the attributes in order of importance for the purpose of detecting commonalities with other users. Continuing with FIG. 5, if the first user 102 is the same age 550 and has common "other interests" 430 with the second user 104, the messaging service is faced with the conflict of presenting the second user's screen name in both yellow and red simultaneously. However, if the age attribute 550 is given priority, the user's screen name will be presented in yellow. Such a conflict will not arise when viewing a user profile, because each attribute is individually displayed as part of the user profile.

In one embodiment, the first user's definitions of which visual highlights to apply are stored locally, such as on first device 103. However, in another embodiment, the visual highlight definitions are stored by server 120, such as in database 130. By storing the definitions on the server 120, a user may retain their visual highlight definitions even when using the messaging service on multiple devices, such as a cell phone or office computer.

Turning to FIG. 6, an example schema for storing visual highlight definitions is shown in box 650. An effect table 660 may define each visual highlight available for the user in defining which visual highlights correspond to which attribute commonalities. Each effect may have a unique identifier 662, that can be used to relate a particular effect to an attribute 630. The attribute 630 may then be related to a user 610, as previously described. As a result, the messaging service can retrieve all visual highlights corresponding to any user attribute for which the messaging service is provided the unique user identifier. A similar schema (not shown) may be used to relate an attribute group to particular visual highlights. Many different schemas and methods are possible for storing user definitions of how visual highlights should be applied, and FIG. 6 is only one example.

Figure 7:
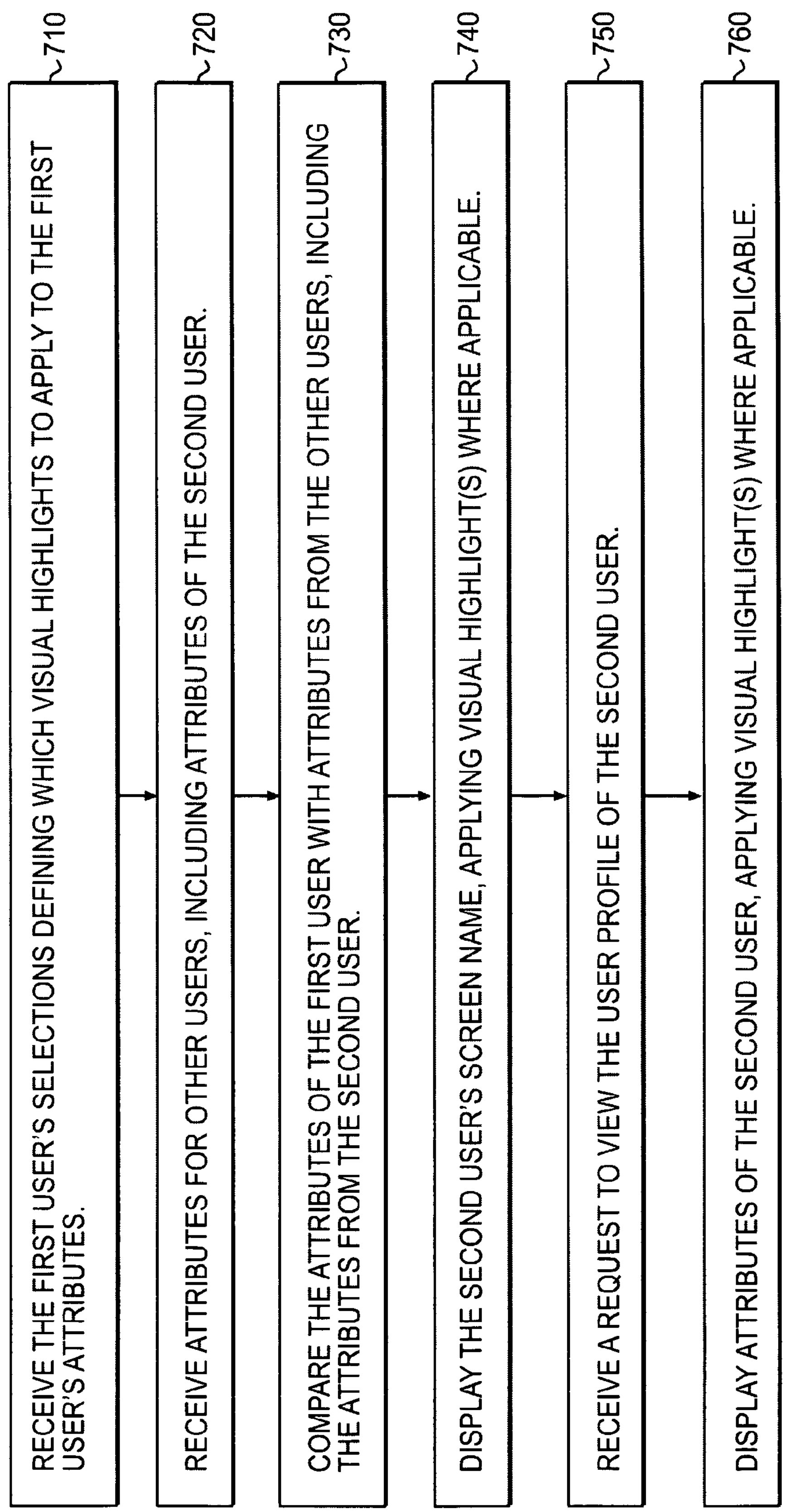
FIG. 7 is an exemplary method to visually distinguish common and uncommon attributes, in accordance with one embodiment.

FIG. 7 is an exemplary method for visually distinguishing common attributes among users, in one embodiment. At step 710, selections are received from the first user 102, defining visual highlights to apply to various attributes. The selections may be received by the first user device 103, in accordance with an embodiment. In another embodiment, the definitions are sent to server 120 for storage. In yet another implementation, defining which visual highlights apply to which attributes is not an available feature. In some embodiments, the system operator can define a set of default effects for attribute commonality.

The first user may be prompted to define which visual highlights apply to the user attributes in one embodiment. For example, the messaging service may prompt the first user to define the visual highlights when the first user is defining their attributes. In that embodiment, when the first user selects (or types) an attribute to associate with themselves, the messaging service may ask the user to select a visual highlight to apply to the attribute. This process may take place when the first user creates a messaging service account in one embodiment. In another embodiment, the messaging service may include an option to allow the first user to further define their attributes whenever the first user chooses.

At step 720, the first device 103 receives attributes of a second user. In one embodiment, step 720 occurs as a result of the first device 103 contacting the server 120. For example, the first device 103 may contact the server 120 when the first user attempts to start the messaging service. In another embodiment, when the first user 102 attempts to view a user profile of a second user 104, the server 120 is contacted so that the first device 103 may retrieve the relevant attributes of the second user 104.

Different events may trigger the reception of attributes of one or more other users (e.g., the second user), depending on the embodiment. For example, when the first user enters into a chat, the messaging service may automatically retrieve the user attributes for the other users in the chat. Likewise, the messaging service may retrieve the attributes of each user in the first user's buddy list when the first user logs into the messaging service. In addition, when a second user sends the first user a message, the first user may receive the attributes of the second user. This may be particularly helpful when the first user does not know the second user, because the first user may be able to decide whether to receive the second user's message based on the second user's attributes.

In one embodiment, the first device 103 may request user attributes from a server by sending a separate request for each user. In another embodiment, attributes for all users in a user list (e.g., buddy list or list of chat participants) are received in a single transaction.

At step 730, the attributes of the first and second user are compared. This step may be performed locally by the first device 103, in one embodiment. In another aspect, the comparison is performed by server 120. Attributes that are common between the first and second users include exact matches and also matches that the system (e.g., first device 103 or server 120) deem as similar. For example, liking Chinese food may be similar to liking oriental cuisine, and therefore the attributes may be common in one embodiment. These similarities may be predicted by an automatic synonym or thesaurus search, or by associating attributes that one or more users have manually designated as similar.

In one embodiment, one or more attributes may comprise a string of words describing multiple attributes. In that case, the system may parse the words in search of similarities. The system may predict where one attribute ends and another begins based on common separators, such as periods, commas, hyphens, and semicolons. In another embodiment, each individual attribute is separately entered by the user when the user sets up their user profile, so such parsing algorithms are not needed to separate multiple attribute descriptors from a single string.

If an exact match is not found but a synonym indicates a common attribute, the system may designate a lower strength value to the commonality in one embodiment. For example, the similarity may not count as a full match when determining whether the number of commonalities for a particular user exceeds a threshold that warrants application of a special visual highlight to the user's screen name.

At step 740, the user names are displayed in a list, and the visual highlights are applied to the user names to visually distinguish common attributes between the viewing user and the listed users in one embodiment. The visual highlights are applied, for example, by the first device 103. However, in one embodiment, the server 120 determines which visual highlights should be applied. In another embodiment, this determination is instead performed locally, such as by the first device 103. One implementation does not include portraying common attributes with the users in the list until the viewing user selects an option to view a specific user profile. Another aspect may allow the first user 102 to turn this feature on and off.

At step 750, the system receives input from the first user to view a user profile. In one embodiment, the server 120 is contacted to check for additional attributes. In another embodiment, the first device 103 requests attributes by directly contacting the second device 105. In still another embodiment, the relevant attributes are received by the first device 103 prior to the first user 102 requesting a user profile.

At step 760, the attributes of the second user 104 are displayed as part of a user profile. In addition, the system applies visual highlights to the attributes if commonalities exist, thereby allowing the viewing user to quickly assess similarities and differences between themselves and the second user 104.

Embodiments of the invention may be implemented in a suitable combination of hardware, firmware, and/or software. Embodiments of the invention include computer-implemented methods and systems, as well as computer program products and programs stored on computer readable media. In particular, the program products may be run across multiple processors, computers, and/or servers.

Other embodiments of the invention will be apparent to those skilled in the art from consideration of the specification and practice of the embodiments and aspects of the invention disclosed herein. For example, while embodiments have been presented herein with respect to messaging services and the Internet, it will be appreciated that embodiments of the invention may be applied to various other types of electronic networks and electronic communication systems. It is intended, therefore, that the specification and examples be considered as exemplary only, with a true scope and spirit of the invention being indicated by the following claims.

What is claimed is:

1. A method for electronically displaying attribute associations between a first user and a second user of a messaging service, comprising:

retrieving a second attribute from a first plurality of attributes that are associated with the second user;

comparing the second attribute to a first attribute of the first user;

designating a common attribute when the comparison reveals that the first attribute is similar to the second attribute;

accessing a rank defined by the first user for the common attribute, wherein the rank indicates a degree of importance of the commonality of the first attribute and the second attribute relative to other commonalities existing between attributes associated with the first user and the second user; and visually distinguishing the common attribute of the second user within a display viewable by the first user to the exclusion of the other commonalities existing between attributes associated with the first user and the second user, based on the rank of the common attribute being higher than the rank of the other commonalities.

2. The method of claim 1, further comprising displaying a screen name associated with the second user in a list, the list comprising a plurality of screen names for a first plurality of users; and wherein the common attribute is visually distinguished by applying a visual highlight to the name associated with the second user.

3. The method of claim 1, further comprising displaying a user profile containing the first plurality of user attributes;

wherein the common attribute is visually distinguished among the first plurality of attributes.

4. The method of claim 1, wherein the visual highlight is selected from a group including color, font, font size, font effect, and animation.

5. The method of claim 4, wherein the visual highlight selection is defined by the first user, the definition specifying which visual highlight corresponds to user attributes that are identified as similar to the first attribute.

6. The method of claim 1, wherein multiple attributes are identified as common to the first and second user.

7. The method of claim 1, wherein the visual distinction is based on a threshold level of commonalties being met between the second user and first user.

8. A system for displaying attribute associations to a viewing user, the system comprising:

a display capable of presenting information to the viewing user;

a memory containing instructions; and a processor coupled to the memory, the processor executing the instructions to perform stages comprising:

sending a request for attributes corresponding to at least a second user;

receiving a plurality of attributes, at least one of which corresponds to the second user;

identifying which attributes of the second user are associated with the attributes of the viewing user;

accessing a rank defined by the viewing user for at least one identified attribute, wherein the rank indicates a degree of importance of the commonality of the at least one identified attribute relative to other commonalities existing between attributes associated with the viewing user and the second user; and visually distinguishing, on the display, the at least one identified attribute to the exclusion of the other commonalities existing between attributes associated with the viewing user and the second user, based on the rank of the at least one identified attribute being higher than the rank of the other commonalities.

9. The system of claim 8, wherein at least one identified associated attribute indicates a dissimilarity between the viewing and second users.

10. The system of claim 8, wherein stages further comprise simultaneously displaying, on the display, a plurality of user screen names; and wherein visually distinguishing the at least one identified attribute includes applying a visual highlight to a screen name associated with the second user in a manner that indicates a particular attribute similarity with the viewing user.

11. The system of claim 8, wherein the stages further comprise displaying, on the display, a user profile for the second user, the user profile including the at least one attribute corresponding to the second user; and wherein visually distinguishing the at least one identified attribute comprises highlighting the user profile.

12. The system of claim 8, wherein the plurality of attributes correspond to multiple users; and wherein the stages further comprise:

identifying, from the plurality of received attributes, a most common user that has the largest number of attributes in common with the viewing user; and visually distinguishing, on the display, the most common user among the plurality of user profiles.

13. A computer-readable storage medium containing instructions that, when executed by a processor, cause the processor to perform stages comprising:

receiving a first plurality of attribute selections from a viewing user;

receiving a second plurality of attributes from a second user;

identifying at least one common attribute between the first and second pluralities of attributes;

accessing a rank defined by the viewing user for the at least one common attribute, wherein the rank indicates a degree of importance of the commonality of the at least one common attribute relative to other commonalities existing between the first and second pluralities of attributes; and visually distinguishing, on a display, the at least one common attribute to the exclusion of the other commonalities existing between the first and second pluralities of attributes, based on the rank of the at least one common attribute being higher than the rank of the other commonalities.

14. The computer-readable storage medium of claim 13, wherein the viewing user and second user define the first and second pluralities of attributes as part of a social network.

15. The computer-readable storage medium of claim 13, wherein the at least one common attribute is visually distinguished when the viewing user views on the display a user profile of the second user.

16. The computer-readable storage medium of claim 13, wherein the at least one common attribute is visually distinguished when the viewing user views on the display a list of multiple users, the list including the second user.

17. The computer-readable storage medium of claim 13, wherein visually distinguishing the at least one common attribute includes selecting a visual highlight from a group including color, font, font size, and font effect.

18. The computer-readable storage medium of claim 17, wherein a second visual highlight indicates a second common attribute.

19. A computer-readable storage medium containing instructions that, when executed by a processor, cause the processor to define a visual highlight as applying to a user attribute by performing stages comprising:

receiving a first input from a first user, describing a first attribute of the first user;

receiving a second input from the first user that defines a visual highlight to apply to a second attribute that is identified as associated with the first attribute;

receiving a third input from the first user that defines a rank indicating a degree of importance of the association of the first attribute with the second attribute relative to other associations existing between attributes of the first user and the second user;

storing at least the second input on a storage medium; and visually distinguishing the second attribute to the exclusion of other attributes, based on the rank indicating the degree of importance of the association of the first attribute with the second attribute being higher than the rank of the other associations existing between attributes of the first user and the second user.

20. The computer-readable storage medium of claim 19, wherein the association indicates a matching attribute.

21. The computer-readable storage medium of claim 19, wherein the association indicates an opposing attribute.

* * * * *